(12) United States Patent
Vanni

(10) Patent No.: US 8,776,972 B2
(45) Date of Patent: Jul. 15, 2014

(54) TORQUE CONVERTER WITH LEAF SPRING BUCKLING PREVENTION

(75) Inventor: Jeremy Vanni, Sterling, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 280 days.

(21) Appl. No.: 13/312,054

(22) Filed: Dec. 6, 2011

(65) Prior Publication Data

US 2012/0152679 A1 Jun. 21, 2012

Related U.S. Application Data

(60) Provisional application No. 61/423,722, filed on Dec. 16, 2010.

(51) Int. Cl.
*F16H 45/02* (2006.01)
*F16D 3/06* (2006.01)

(52) U.S. Cl.
USPC .................. 192/3.29; 192/70.18; 192/109 R; 192/200

(58) Field of Classification Search
USPC .................. 192/70.18, 200; 464/100, 169
See application file for complete search history.

(56) References Cited

U.S. PATENT DOCUMENTS

| | | | | |
|---|---|---|---|---|
| 4,353,444 A | * | 10/1982 | Bionaz | 192/3.29 |
| 4,577,740 A | * | 3/1986 | Carmillet | 192/70.18 |
| 6,065,577 A | * | 5/2000 | Arhab et al. | 192/70.18 |
| 8,016,091 B2 | | 9/2011 | Heck et al. | |

* cited by examiner

*Primary Examiner* — Richard M. Lorence
(74) *Attorney, Agent, or Firm* — Simpson & Simpson, PLLC

(57) ABSTRACT

A buckling prevention device including a first rotational element, a second rotational element, a leaf spring arranged for transferring torque between the first and second rotational elements while enabling relative axial movement between the first rotational element and the second rotational element, a connection member fixedly connecting the leaf spring to the second rotational element, wherein the connection member extends axially through a hole in the first rotational element, wherein a gap is formed between the connection member and an edge of the hole when the leaf spring is not experiencing an overly high compression force, and wherein the connection member is operatively arranged to close the gap and engage with the first member when the spring is experiencing an overly high compression force for preventing the leaf spring from buckling and at least partially transferring the torque directly between the first and second rotational elements.

4 Claims, 3 Drawing Sheets

TORQUE CONVERTER WITH LEAF SPRING BUCKLING PREVENTION

CROSS-REFERENCE TO RELATED APPLICATIONS

This application claims the benefit under 35 U.S.C. §119(e) of U.S. Provisional Application No. 61/423,722 filed Dec. 16, 2010, which application is incorporated herein by reference.

FIELD OF THE INVENTION

The invention broadly relates to torque converters, more specifically to leaf springs for setting the position of a piston in a torque converter, and even more particularly to a device for preventing the buckling of leaf springs in a torque converter.

BACKGROUND OF THE INVENTION

Torque converters are well known in the art. Torque converters often include a piston that is axially moveable for engaging a clutch. Leaf springs may be included for transferring torque (directly or indirectly) from the cover of the torque converter to the piston. The leaf springs enable the transfer of torque through the leaf springs to the piston while also being able to flex to enable the piston to move axially with respect to the torque converter cover or a drive plate for the leaf springs. For example of one type of leaf spring arrangement, see United States Patent Publication No. 2008/0190723 (Heck et al.) which Patent Publication is hereby incorporated by reference in its entirety. Typically, the leaf springs are arranged so that in a normal drive mode of operation of the torque converter, the leaf springs are subjected to only tensile forces. Since the springs are, for example, thin plate-like members, they have good tensile strength.

While coasting in an automobile, however, the forces are reversed so that the leaf springs are subjected to compression forces. By coasting, it is meant generally that the engine is idling, but the vehicle is moving, including the components of the torque converter. The compression forces on the leaf springs are a result of resistance of the engine that is coupled to the torque converter. The compression forces create a risk that the leaf springs will buckle, and become permanently bent or deformed. The engine resistance is sometimes referred to as providing "engine braking" Basically, the torque converter and other elements are still rotating when the automobile is coasting, but the engine is not (or only to some marginal degree while idling), so the torque converter components generally act to rotate the engine while the engine is idling, instead of the other way around. The engines of many automobiles, such as typical passenger cars, do not usually exhibit engine resistance large enough to make buckling of the leaf springs a substantial risk. However, the engines of some automobiles, such as semitrailers, are arranged to strongly resist rotation while coasting, and provide a large amount of engine braking, which is exerted as compression forces on opposite ends of the leaf springs. As a result, in these vehicles there is a very real risk that the leaf springs will buckle when coasting.

BRIEF SUMMARY OF THE INVENTION

The present invention broadly comprises a buckling prevention device including a first rotational element, a second rotational element, a leaf spring arranged for transferring torque between the first and second rotational elements while enabling relative axial movement between the first rotational element and the second rotational element, a connection member fixedly connecting the leaf spring to the second rotational element, wherein the connection member extends axially through a hole in the first rotational element, wherein a gap is formed between the connection member and an edge of the hole when the leaf spring is not experiencing an overly high compression force, and wherein the connection member is operatively arranged to close the gap and engage with the first member when the spring is experiencing an overly high compression force for preventing the leaf spring from buckling and at least partially transferring the torque directly between the first and second rotational elements. In one embodiment, the first rotational element is a drive plate for the leaf spring. In one embodiment, the second rotational element is a piston for engaging a clutch. In one embodiment, the connection member is a retainer rivet having a head for engaging against the first rotational element for limiting axial movement between the first rotational element and the second rotational element in one axial direction.

The current invention also broadly comprises a torque converter including the buckling prevention device described above. In one embodiment, the second rotational element is a piston for engaging a clutch. In one embodiment, the leaf spring is operatively arranged to hold the piston in an open position with respect to the clutch. In one embodiment, the first rotational element is at least coupled mechanically to a torsional input to the torque converter. In one embodiment, the first rotational element is a drive plate for the leaf spring, and the drive plate is connected to a cover for the torque converter, and wherein the cover is connected to the torsional input. In one embodiment, the overly high compression force is a result of resistance in the torsional input, while the torsional input is idling, opposing a rotation of the cover of the torque converter. In one embodiment, the clutch is a lock-up clutch for mechanically coupling a damper of the torque converter to a cover of the torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
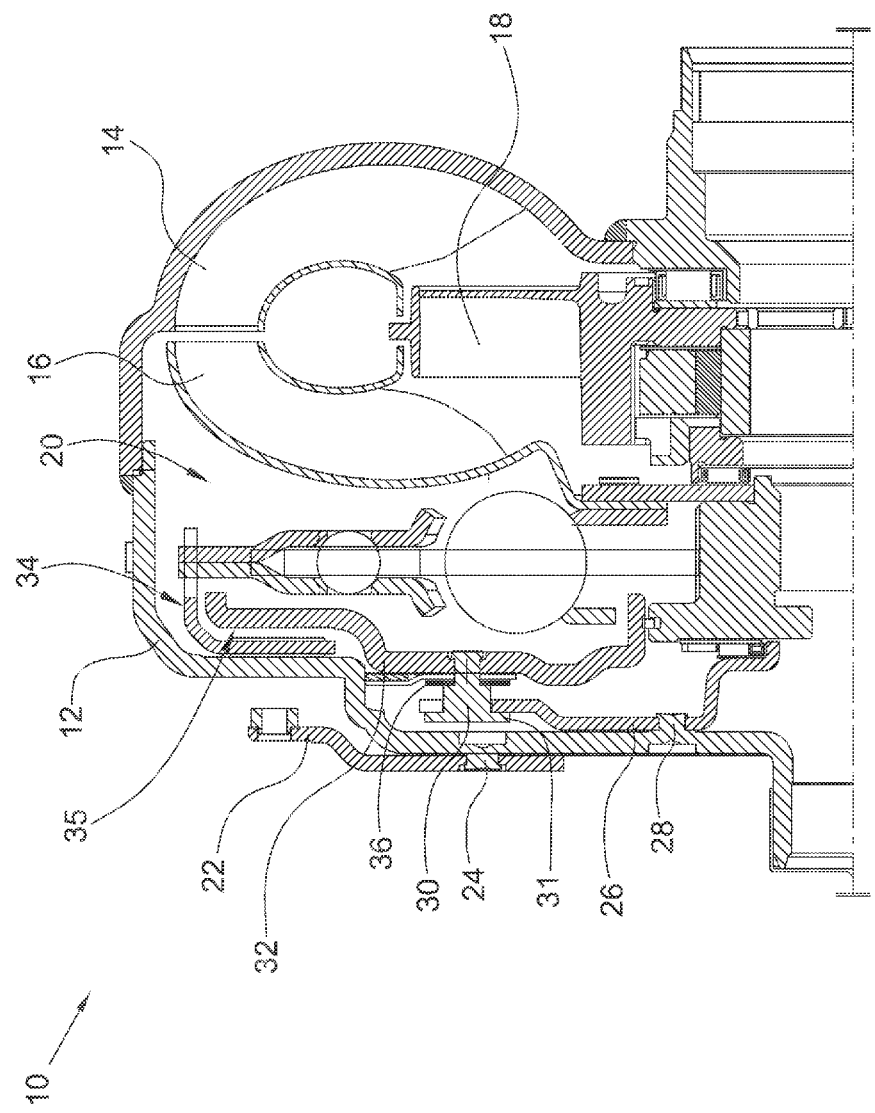
FIG. 1 is a cross-sectional view of a torque converter.
Figure 2:
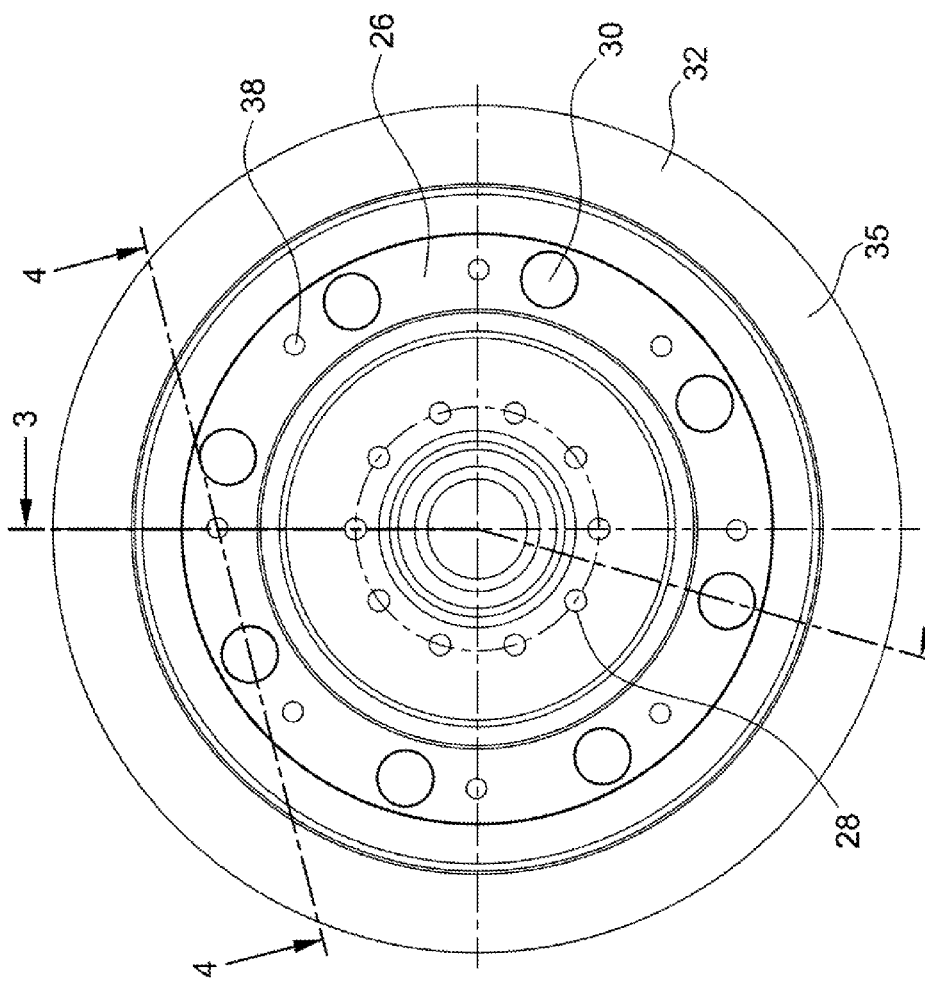
FIG. 2 is a front view of a leaf spring arrangement for a piston.
Figure 3:
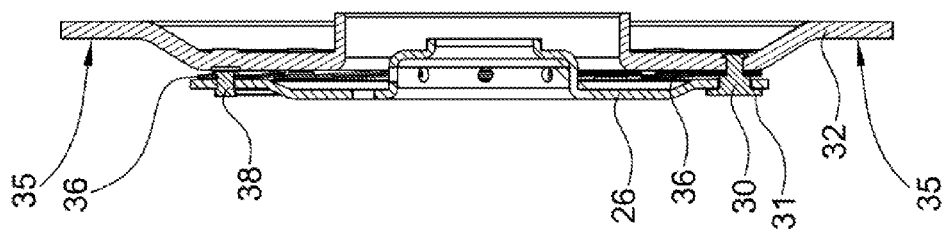
FIG. 3 is a cross-sectional view of the leaf spring arrangement taken generally along line 3-3 in FIG. 2.

Referring now to the figures, FIG. 1 shows torque converter 10. Torque converter 10 includes cover 12, impeller 14, turbine 16, stator 18, and vibration damper 20 for transferring torque from an engine (not shown) to an input shaft for a transmission (not shown).

Cover 12, impeller 14, turbine 16, stator 18, and vibration damper 20 could generally take any form known in the art, and the illustrated embodiment is for explanation purposes only.

In the embodiment shown throughout FIGS. 1-5, torque is transferred from an engine into drive plate 22, which is then transferred to cover 12 via rivets 24. The torque is then transferred to leaf spring drive plate 26 via rivets 28. Retainer rivet 30 is provided between leaf spring drive plate 26 and piston 32, but it is not arranged for transferring torque directly between plate 26 and piston 32 under normal operating conditions, as there is some play or looseness in the leaf spring drive plate around the retainer rivet. Thus, retainer rivet 30 and plate 26 are moveable with respect to each other to some degree. The retainer rivet is limited with respect to plate 26 on one side due to enlarged head 31 on rivet 30 for setting an axial limit for piston 32 while the piston transitions into an open position, as will be described in more detail below.

Figure 4:
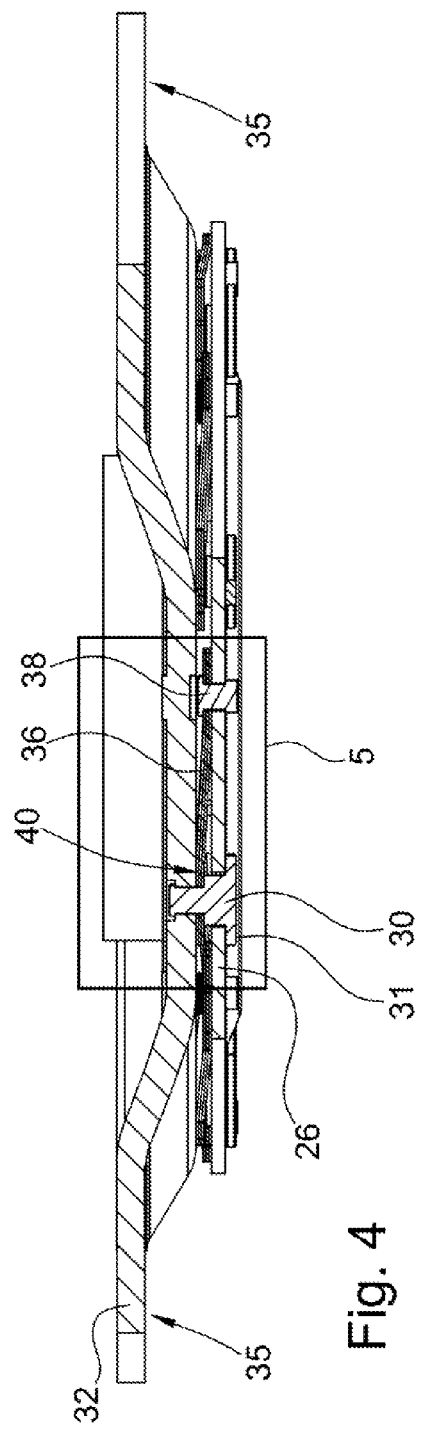
FIG. 4 is a cross-sectional view of the leaf spring arrangement taken generally along line 4-4 in FIG. 2; and, FIG. 5 is an enlarged view of a buckling stop device for the leaf spring arrangement of FIG. 4.
Figure 5:
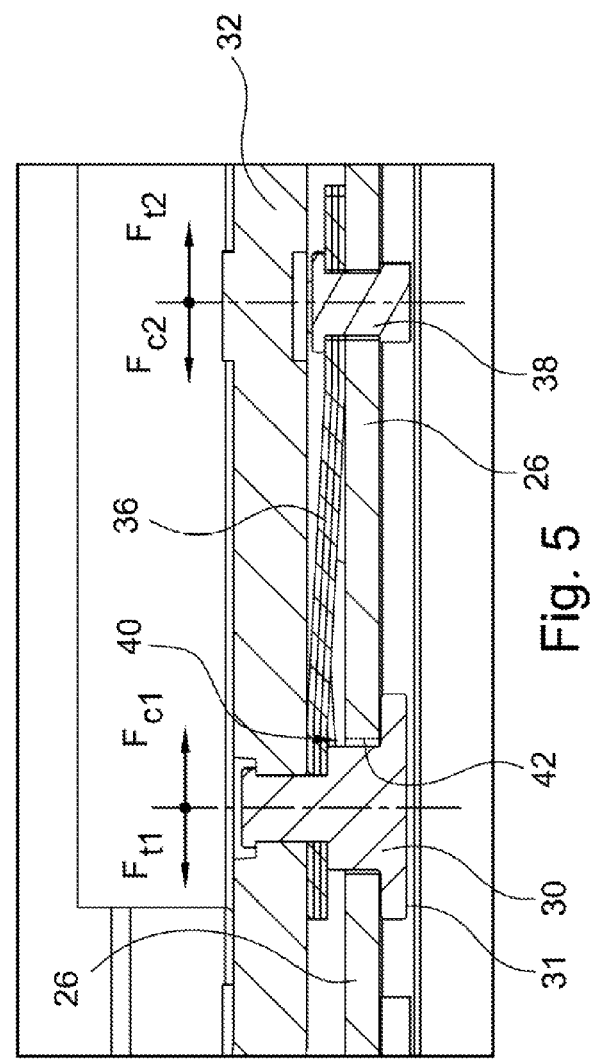

Torque is transferred from plate 26 to piston 32 via leaf springs 36. Specifically, as shown in FIGS. 4 and 5, the leaf spring is fixed to plate 26 via rivet 38 and to piston 32 via retainer rivet 30. Thus, torque is not transferred from drive plate 26 to piston 32 directly via retainer rivet 30, but instead torque is transferred from plate 26 to rivet 38 to leaf springs 36 to retainer rivet 30 and finally to piston 32. Typically, a plurality of leaf springs is provided about the outer perimeter of the leaf spring drive plate. Piston 32 has two axial positions, namely, an open position and a closed position, for engaging or enabling disengagement of clutch 34, respectively. That is, surface 35 of piston 32 is brought into engagement with clutch 34 for locking damper 20 to cover 12, or surface 35 is brought away from clutch 34 to enable the clutch to disengage.

In FIG. 1, piston 32 is shown in the open position. The piston can be moved into the closed position, for example, by pressurizing and/or depressurizing the various chambers of the torque converter. When the pressure is released or equalized on both axial sides of the piston, the piston returns to the open position, for example, due to the pressure forces and/or slightly urged by the leaf springs, as generally shown in FIG. 1. During this transition from the closed position to the open position, the piston in some prior art torque converters will tend to collide with other components of the torque converter, such the damper, for example, due to flexing or shifting of the components. In order to prevent piston 32 from axially moving too far away from clutch 34 and colliding with damper 20, for example, head 31 is provided on retainer rivet 30 for providing a retaining function for piston 32. That is, rivet 30 is rigidly secured to piston 32 at one end, with the other end moveable with respect to drive plate 26. However movement between rivet 30 and plate 26 is limited by head 31, which acts as a stop to limit how far rivet 30, and therefore piston 32, can axially move in the direction toward damper 20. In this way, rivet 30 can be provided as a positive stop for setting a limit for the open position of piston 32. It should be appreciated that the ability of the piston to engage clutch 34 is not compromised because rivet 30 is not secured to plate 26, and head 31 of retainer rivet 30 does not limit the axial movement of the piston in both axial directions.

Advantageously, leaf springs 36 can flex to enable axial movement of the piston with respect to plate 26 while also enabling the transfer of torque through the springs. Typically, when the engine is being driven, the engine is transferring torque through the leaf spring such that rivets 30 and 38 are pulling on the leaf spring in opposite directions, resulting in tensile forces in the leaf spring. For example, as illustrated in FIG. 5, rivet 30 results in tensile force component $F_{t1}$ on the leaf spring, while rivet 38 results in tensile force component $F_{t2}$ on the leaf spring. Since the leaf spring is essentially a thin plate-like member, it has good tensile strength and forces $F_{t1}$ and $F_{t2}$ will not easily damage the leaf spring.

However, when the engine is idling and the vehicle is moving, the torque converter is still rotating in the drive direction, but the engine will not. Instead, as mentioned supra, the engine will resist the rotation, so that cover 12 actually transfers torque back to the engine. That is, while coasting, the engine is idling and instead of driving the torque converter cover, the engine is rotated by the torque converter cover. Again, frictional forces in the engine oppose this rotation while the engine is idling. As a result, rivets 30 and 38 will exert forces on the leaf spring towards each other. That is, rivet 30 will exert force $F_{c1}$ on the leaf spring toward rivet 38, while rivet 38 exerts opposing force $F_{c2}$ on the leaf spring in the direction of rivet 30. If the torque, and therefore force, is high enough, then these compressive forces can exceed a critical level, resulting in buckling of the leaf springs, which would generally cause the leaf spring to bend, bringing rivets 38 and 30 closer together. Springs are used primarily because they demonstrate good elastic properties, namely, they return to their original shape after an applied force is removed. Under too much compressive force, however, the buckling will cause the springs to yield and become plastically deformed.

Retainer rivet 30 is also arranged with leaf spring drive plate 26 to prevent buckling of leaf springs 36. As mentioned previously, there is some play or looseness between rivet 30 and drive plate 26. Specifically, as can be seen in FIG. 4 and the enlarged view of FIG. 5, gap 40 is provided between the body of rivet 30 and drive plate 26. Specifically, rivet 30 extends axially through hole 42 in drive plate 26. Gap 40 could be formed, for example, by making hole 42 in drive plate 26 greater in diameter than rivet 30, or by making hole 42 ellipsoidal or some other shape. Gap 40 is positioned such that if leaf spring 36 begins to buckle, rivet 30 will shift toward drive plate 26 in the direction of force $F_{c1}$ and close the gap. With enough deformation of leaf spring 36, gap 40 will close completely, and rivet 30 will engage against plate 26 at the edge of hole 42. Once the gap is closed and rivet 30 is pressed firmly against drive plate 26, rivet 30 will prevent further buckling of the leaf spring by acting as a stop against the edge of the hole in drive plate 26. Additionally, torque from piston 32 to drive plate 26 will be at least partially transferred directly through rivet 30. That is, drive plate 26 and rivet 30 act to provide a hard stop for limiting the compression or buckling experienced by the leaf springs. Accordingly, the leaf springs are only able to buckle a distance approximately equal to gap 40.

The leaf springs are provided so that there is not a hard mechanical link to the piston, such as by a rivet, because such a link may cause a rattling or other performance issues. By creating this hard mechanical link only when necessary, that is, to prevent buckling of the leaf springs, performance is not decreased and the longevity of the system, the leaf springs in particular, is greatly improved. In this way, the size of gap 40 and/or hole 42 can be altered to achieve a balance between the amount of buckling allowed in the leaf springs and how often the rivet will engage with the drive plate.

It should be appreciated that while rivets are disclosed as the preferred connection means for connecting the various components of the torque converter together, other connecting members could be used in lieu of rivets. For example, bolts could be used in a similar fashion as any of the rivets, and including a head for a retaining function similar to head 31.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A torque converter comprising:
    a cover arranged to receive torque;
    an impeller non-rotatably connected to the cover;
    a turbine;
    a stator located between the impeller and the turbine;
    a drive plate:
        directly non-rotatably connected to the cover at a first portion of the drive plate; and,
        arranged to receive the torque from the cover;
    a lock-up clutch including a piston, the piston axially displaceable to open and close the lock-up clutch and having a portion located radially outward of the drive plate;
    a leaf spring arranged for transferring torque between said drive plate and piston while enabling relative axial movement between said piston and said drive plate;
    a connection member:
        consisting of a single piece of material;
        connected to the drive plate at a second portion of the drive plate radially outward of the first portion; and,
        fixedly connecting said leaf spring to said piston, wherein:
        the drive plate is axially located between the cover and the piston;
        said connection member extends axially through a first hole in said drive plate;
        a gap is formed between said connection member and an edge of said first hole; and,
        said connection member is operatively arranged to close said gap and engage with the drive plate for both preventing said leaf spring from buckling and at least partially transferring said torque directly between said drive plate and said piston.

2. The torque converter recited in claim 1, wherein said connection member is a retainer rivet having a head for engaging against the drive plate for limiting axial movement between the drive plate and the piston in one axial direction.

3. The torque converter recited in claim 1, wherein said leaf spring is operatively arranged to hold said piston in an open position with respect to said clutch.

4. The torque converter recited in claim 1, further comprising:
    a damper, wherein said lock-up clutch is for mechanically coupling the damper to the cover.

* * * * *